Figure 1:
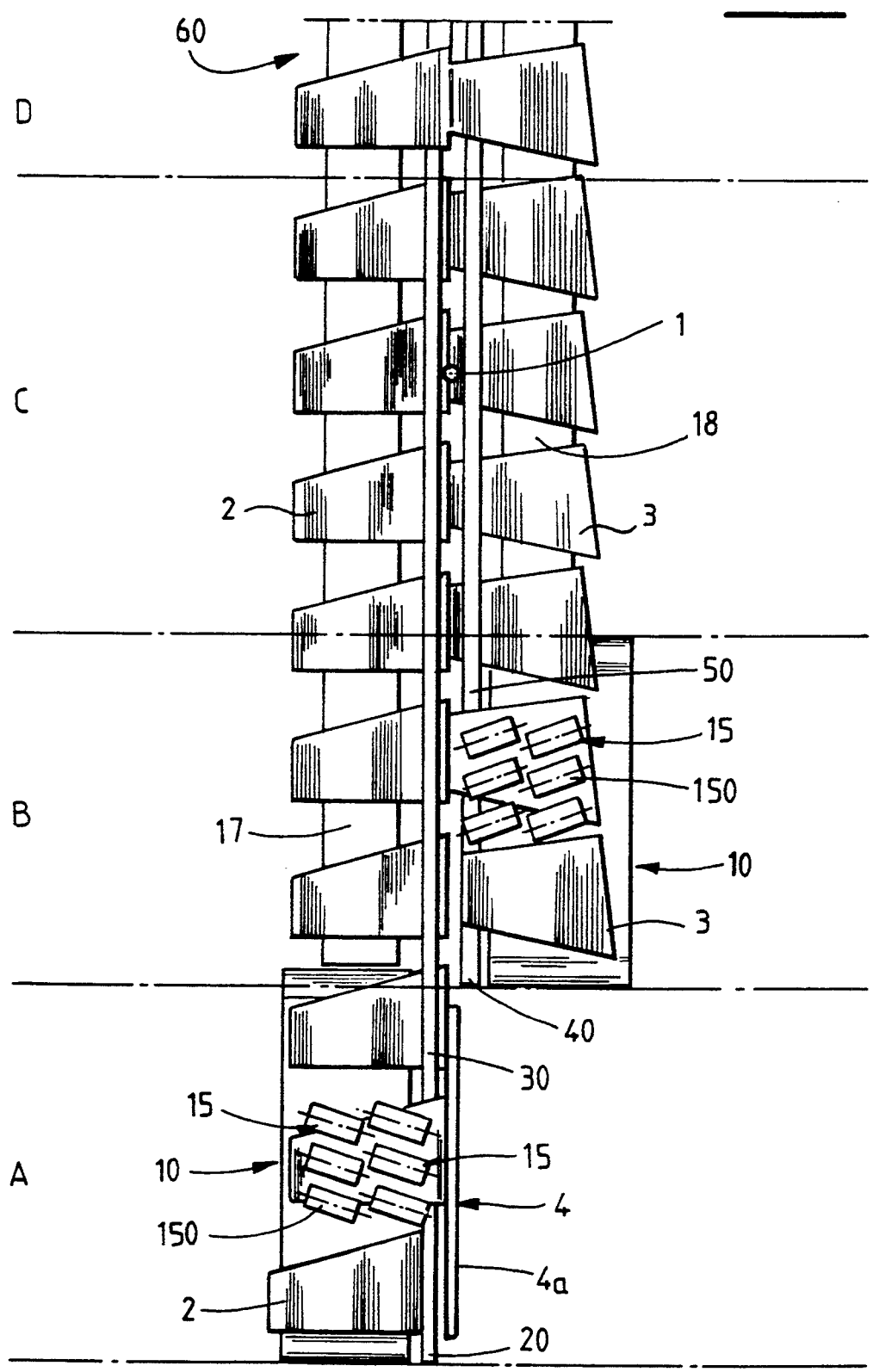

United States Patent [19]

Gilles et al.

[11] Patent Number: 5,364,006

[45] Date of Patent: Nov. 15, 1994

[54] DEVICE FOR POSITIONING SHEET BLANKS IN AN INSTALLATION FOR THE CONTINUOUS BUTT WELDING OF SAID SHEET BLANKS

[75] Inventors: Peru Gilles; Francis Sauvage, both of Dunkerque; Yvon Le Roy, Le Doulieu; Charles Sion, Camphin-En-Carembault, all of France

[73] Assignee: Sollac, Puteaux, France

[21] Appl. No.: 135,619

[22] Filed: Oct. 14, 1993

[30] Foreign Application Priority Data

Nov. 30, 1992 [FR] France ............... 92 14409

[51] Int. Cl.⁵ ........................................... B23K 26/00
[52] U.S. Cl. .................... 228/4.1; 228/44.3; 228/49.4; 219/121.63; 219/121.82
[58] Field of Search ............ 228/4.1, 5.7, 5.1, 44.3, 228/47.1, 49.4; 219/101, 121.63, 121.82

[56] References Cited

U.S. PATENT DOCUMENTS 4,988,845  1/1991  Bauer et al. .................. 219/121.63
5,023,427  6/1991  Neiheisel et al. .................. 228/49.4
5,098,005  3/1992  Jack ........................................ 228/4.1
5,131,581  7/1992  Geiermann ........................ 228/49.4
5,276,304  1/1994  Sauvage et al. .................... 228/49.4

FOREIGN PATENT DOCUMENTS 0438612  7/1991  European Pat. Off. .

*Primary Examiner*—Samuel M. Heinrich
*Attorney, Agent, or Firm*—Oblon, Spivak, McClelland, Maier & Neustadt

[57] ABSTRACT

The invention provides a device for positioning sheet blanks (2, 3) in an installation for the continuous butt welding of the sheet blanks (2, 3) by means of a laser beam. The device comprises, on one hand, a conveyor table formed by an alternating arrangement of rails (11) having balls and bands (12) provided with projecting studs (13) evenly spaced apart and, on the other hand, friction means (15) adapted to be applied on the upper face of the sheet blanks (2, 3) and impart to the sheet blanks a movement in translation which is substantially perpendicular to the direction of feed of the sheet blanks (2, 3).

11 Claims, 4 Drawing Sheets

DEVICE FOR POSITIONING SHEET BLANKS IN AN INSTALLATION FOR THE CONTINUOUS BUTT WELDING OF SAID SHEET BLANKS

The present invention relates to a device for positioning sheet blanks in an installation for the continuous butt welding of at least two sheet blanks by means of a laser beam.

The welding by means of a laser beam of at least two sheet blanks has opened up considerable industrial possibilities, in particular in the production of butt-welded parts, for example for the automobile industry.

Indeed, two sheet blanks with a butt joint therebetween, i.e. assembled edge to edge without overlapping, and welded by means of a laser beam, fully retain their press-forming capability.

The sheet blanks may have different geometric shapes and/or different thicknesses, and may even be of different grades of steel.

In order to achieve a correct butt joint and weld by means of a laser beam between at least two sheet blanks in such manner that the press-formability of the welded sheet blanks remains optimum, the sheet blanks to be welded must be disposed with their edges butting against each other without gaps and, in the case of sheet blanks of different shapes, their longitudinal positioning relative to each other must be perfect.

Further, it is essential to ensure, on one hand, a perfect lateral positioning of the sheet blanks so that the joint plane of the two sheets is located on the axis of the laser beam and, on the other hand, a longitudinal and lateral relative positioning of said sheet blanks during their feed so as to maintain the joint plane of said sheets on the axis of the laser beam.

In the case of an industrial installation, the positioning of the sheet blanks must be continuous.

Consequently, an industrial installation must permit the reception of the sheet blanks, the positioning of said sheet blanks relative to each other and relative to the axis of the laser beam as they are fed toward the laser beam, then the maintenance of this relative positioning during their feed, and the welding of the sheet blanks and finally the discharge of the latter.

An object of the present invention is therefore to provide a device for positioning sheet blanks in an installation for the continuous butt welding of at least two sheet blanks by means of a laser beam which permits positioning the edges to be welded of the sheet blanks on the axis of the laser beam irrespective of the contour and dimensions of the sheet blanks to be welded.

The invention therefore provides a device for positioning sheet blanks in an installation for the continuous butt welding of at least two of said sheet blanks by means of a laser beam, said device comprising means for supporting in a horizontal reference plane and for feeding the sheet blanks in a direction toward the laser beam, and means for laterally positioning the edges to be welded of the sheet blanks on the axis of the laser beam, characterized in that said sheet blank supporting and feeding means comprise, on one hand, a conveyor table constituted by an alternating arrangement of rails having balls and bands provided with projecting studs evenly spaced apart and, on the other hand, friction means adapted to be applied against the upper face of the sheet blanks and to impart to said sheet blanks a movement in translation substantially perpendicular to the direction of feed of the sheet blanks, said ball rails and said bands extending in a direction parallel to the direction of feed of the sheet blanks, and said bands being horizontally movable and each connected to releasable driving means for adjusting the positioning of the studs of each band relative to the studs of the other bands as a function of the contour of said sheet blanks.

According to other features of the invention:
the guide plane of the ball rails is located above the studded bands and a part of the studs is located above said guide plane,
the studs have a cylindrical shape and are mounted to be freely rotatable about vertical axes,
the friction means comprise parallel rollers driven in rotation and having axes which make with the direction of feed of the sheet blanks an angle of between 75° and 85°,
the speed of rotation of the rollers is lower than or equal to the speed of travel of the studded bands,
the rollers are covered with polyurethane,
the means for driving the studded bands comprise a driving shaft driving each studded band through the medium of a drum adapted to be connected to rotate with the driving shaft by a clutch controlled by a jack which is for example hydraulic,
each drum has a biconical central bore the tapers of which converge inwardly of the drum toward the axis of the latter,
each clutch comprises a hub having two independent rings having a conical outer shape and connected to rotate with the driving shaft, the two rings being movable in translation toward each other in a direction parallel to said driving shaft under the action of the respective jack so as to connect the respective drum to rotate with the driving shaft,
a spring is interposed between said rings of each clutch.

Figure 2:
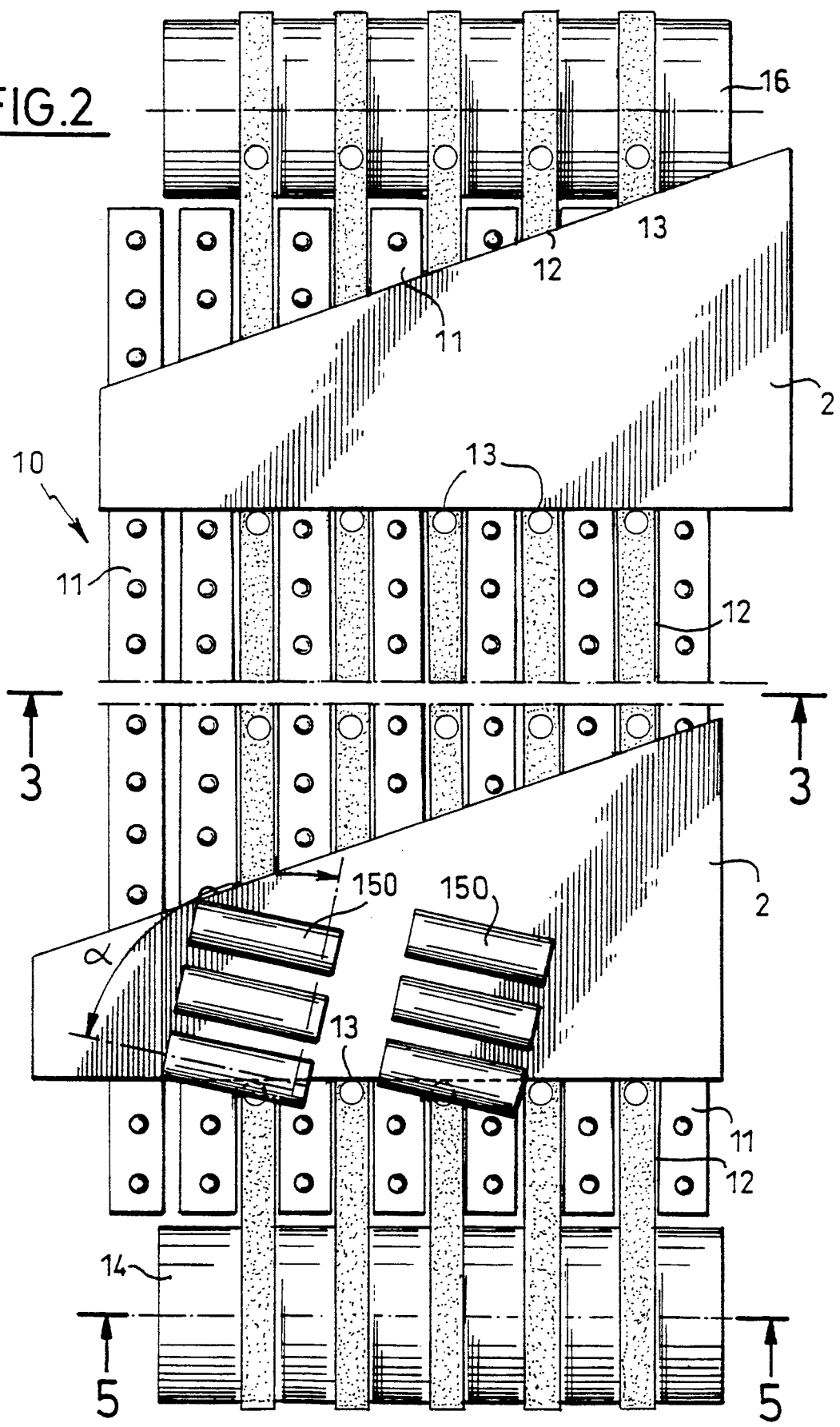
Figure 3:
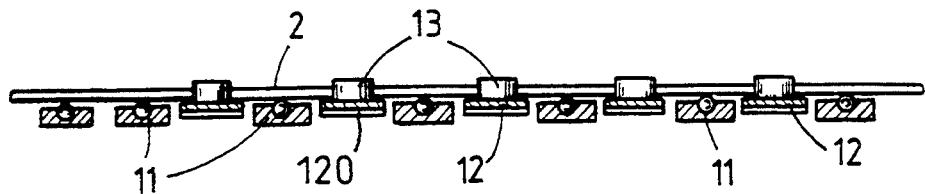
Figure 4:
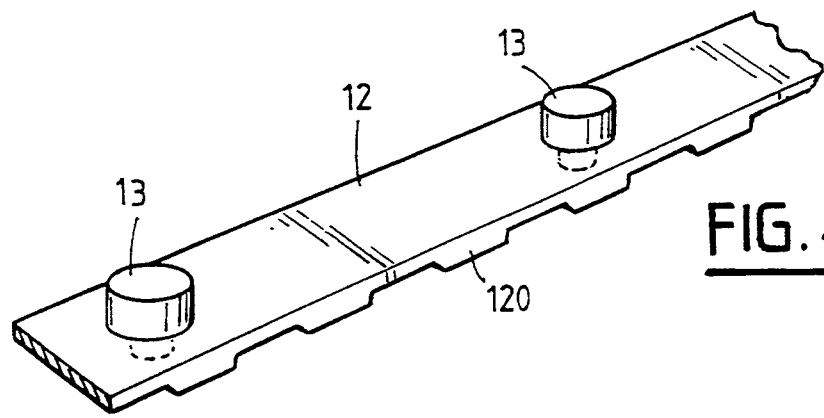
Figure 5:
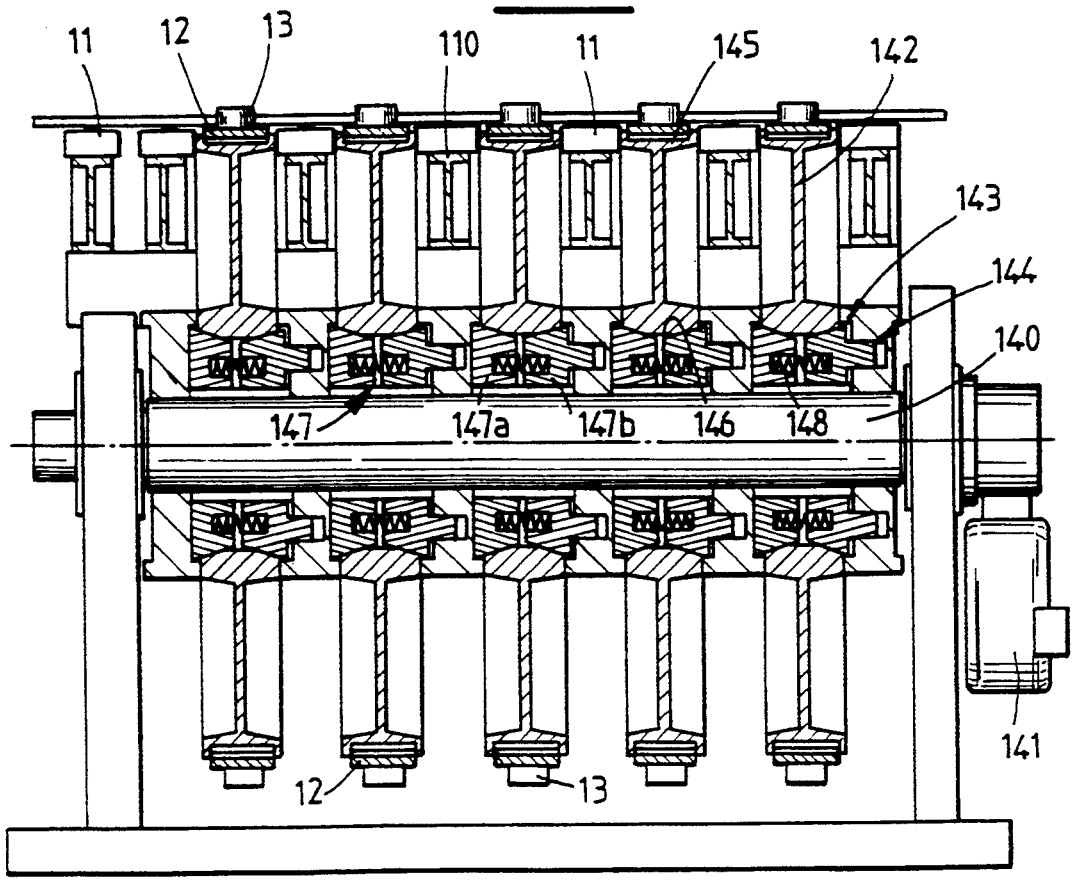
Figure 6:
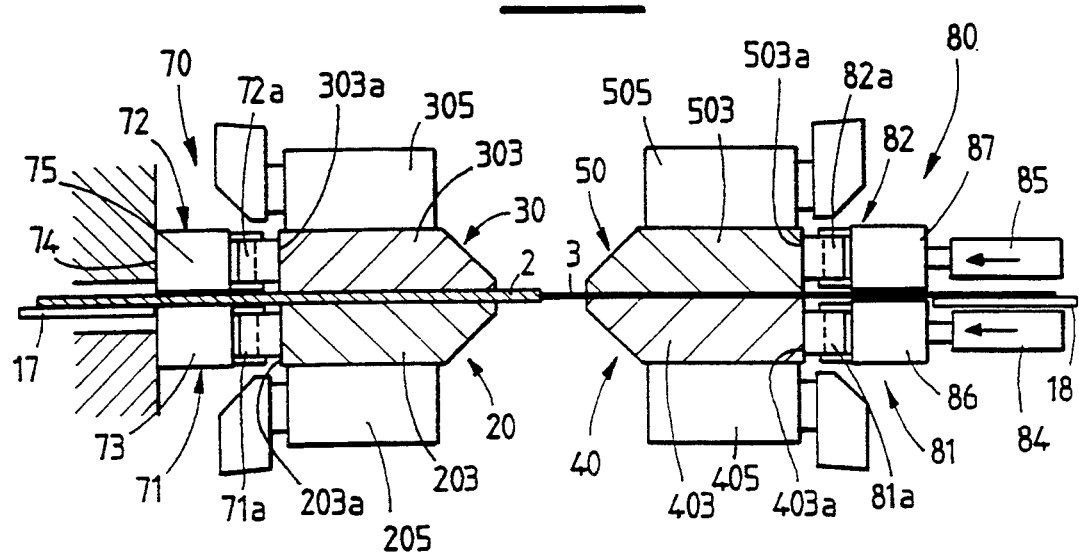
Figure 7:
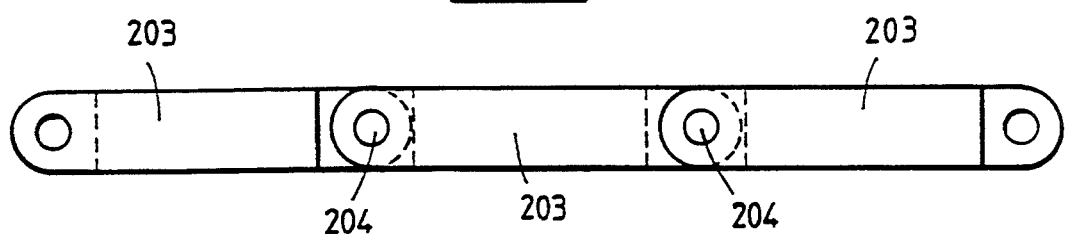
Figure 8:
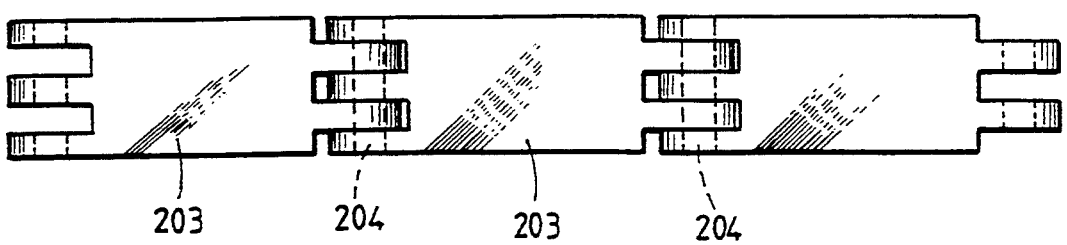

A better understanding of the invention will be had from the following description given solely by way of an example with reference to the accompanying drawings and in which:

FIG. 1 is a diagrammatic top plan view of an embodiment of an installation for the continuous butt welding of sheet blanks by means of a laser beam and including a device according to the invention for positioning each sheet blank, FIG. 2 is a diagrammatic top plan view of the sheet blank positioning device according to the invention, FIG. 3 is a sectional view taken on line 3—3 of FIG. 2, FIG. 4 is a diagrammatic perspective view of a portion of a studded band of the positioning device according to the invention, FIG. 5 is a sectional view taken on line 5—5 of FIG. 2, FIG. 6 is a sectional view taken on line 6—6 of FIG. 1, FIG. 7 is a diagrammatic elevational view of several shoes of an articulated shoe chain, and FIG. 8 is a top plan view of the articulated shoe chain of FIG. 7.

FIG. 1 is an embodiment of an installation for the continuous butt joining and welding by means of a laser beam 1 of a succession of pairs of sheet blanks 2 and 3 of different geometrical shapes and/or different thicknesses, for example for the automobile industry.

The two sheet blanks 2 and 3 of each pair are placed edge to edge and travel continuously below the laser beam 1 so as to be welded by the latter.

To this end, the welding installation shown in FIG. 1 comprises, following on a station for blanking out the sheet blanks 2 and 3:

A) a zone A for laterally positioning the first sheet blank 2 to be welded with respect to the axis of the laser beam 1, B) a zone B for bringing the sheet blanks 2 and 3 to be welded in butting relation, C) a zone C for guiding, conveying and welding the two sheet blanks 2 and 3, D) a zone D for discharging the two welded sheet blanks 2 and 3.

In order to guarantee a good weld quality, the positioning of the sheet blanks 2 and 3 must satisfy, in the welding zone C, several requirements which are in particular the relative position of the edges to be welded with respect to the axis of the laser beam 1 and the relative pressure exerted on said edges so as to control, and even reduce, the gap between said edges in the course of the feed of the sheet blanks 2 and 3.

For this purpose, the zones A and B comprise respectively a device for positioning the first sheet blank 2 and a device for positioning the second sheet blank 3.

The sheet blanks 2 and 3 are previously blanked out and stacked on each side of the welding installation before being transferred to the latter.

The device for positioning the first sheet blank 2 comprises means 10 for supporting in a horizontal reference plane and for feeding the first sheet blank 2 in the direction toward the laser beam, and means 4 for laterally positioning the edge to be welded of said first sheet blank on the axis of the laser beam 1.

As shown in FIGS. 2 and 3, said supporting and feeding means for the first sheet blank 2 comprise a conveyor table formed by an alternating arrangement of rails 11 having balls and bands 12 provided with projecting studs 13 evenly spaced apart.

The ball rails 11 and the bands 12 extend in a direction parallel to the direction of feed of the sheet blanks 2 and the bands 12 are horizontally movable and each connected to releasable driving means 14 for adjusting the position of the studs 13 of each band 12 with respect to the studs 13 of the other bands 12 in accordance with the contour of the sheet blanks 2.

As shown in FIGS. 1 and 2, the supporting and feeding means 10 for the first sheet blank 2 further comprise friction means 15 adapted to be applied against the upper face of the first sheet blank 2 and to impart to this sheet blank a movement in translation substantially perpendicular to the direction of feed of said first sheet blank.

In the zone A, the means for laterally positioning the edge to be welded of the first sheet blank 2 comprise a longitudinal stop 4a constituting a guide and disposed vertically so that a vertical plane containing the lateral face of the stop in facing relation to the ball rails 11 contains the axis of the laser beam 1.

The stop 4a may be constituted by the generatrices of cylindrical rollers which have vertical axes and are arranged in alignment in the vertical reference plane and provide a rolling contact with the sheet blanks.

As shown in FIG. 3, the guide plane provided by the ball rails 11 is located above the studded bands 12 and a part of the studs 13 is located above this guide plane.

The studs 13 are cylindrical in shape and are mounted on the band 12 to be freely rotatable about a vertical axis.

Each band 12 is constituted in the conventional manner by a belt having on the side adapted to cooperate with the driving means 14 teeth 120 which extend in a direction perpendicular to the longitudinal axis of the belt (FIG. 4).

Each studded band 12 constitutes a loop having at one end the driving means 14 and at the opposite end a freely rotatable drum 16.

With reference now to FIG. 5, the releasable means 14 for driving the studded bands 12 will now be described in more detail.

The means 14 for driving the studded bands 12 comprise a 15 driving shaft 140 driven by a motor 141.

The driving shaft 140 drives each studded band 12 through the medium of a drum 142 adapted to be fixed to said driving shaft 140 by a clutch 143 controlled by a jack 144, for example a hydraulic jack.

All the drums 142 and clutches 143 adapted to drivingly connect the driving shaft 140 to the studded bands 12 are identical and therefore only one drum and one clutch will be described.

The drum 142 comprises on its outer surface teeth (not shown) adapted to cooperate with teeth 120 on the respective studded band 12.

The drum 142 has a central biconical bore 146 the tapers of which converge inwardly of the drum toward the axis of the latter.

The clutch 144 comprises a hub 147 composed of two independent rings 147a and 147b having a conical outer shape and connected to rotate with the driving shaft 140, for example by means of splines (not shown).

For the purpose of drivingly connecting the driving shaft 140 to the drum 145, the rings 147a and 147b are movable in translation toward each other in a direction parallel to the driving shaft 140 by the action of the corresponding jack 144 which is for example of the annular type.

A spring 148 is interposed between the rings 147a and 147b.

Putting the jacks 144 between each drum 142 under pressure causes the compression of each hub 147 and clamps the rings 147a and 147b on the biconical bores 146 of the respective drums 142 so that the drums are fixed to the hubs 147 and therefore to the driving shaft 140 as the latter rotates.

Thus, in order to adjust the angular offset between the drums 142, i.e. the position of the studs 13 of each band 12 relative to the studs 13 of the other bands in accordance with the contour of the first sheet blank 2, it is sufficient to release the drums 142 for this adjustment and then reconnect them to the driving shaft 140 by means of the clutches 143 and jacks 144, the biconical bores 146 acting as a guide for the drums 142.

The arrangement chosen for the clutches and the drums permits avoiding an excessive axial displacement of the drums when engaging the clutches which would otherwise have an adverse effect on the performance of the device.

The ball rails 11 are supported by spacer members 110 interposed between the drums 142.

As shown in FIG. 2, the friction means 15 adapted to be applied against the upper face of the first sheet blank 2 and to impart to the latter a movement in translation substantially perpendicular to the direction of feed of the first sheet blank comprise parallel rollers 150 driven in rotation.

The axis of each roller 150 makes with the direction of feed of the first sheet blank 2 an angle α of between 75° and 85°.

The speed of rotation of the rollers 150 is lower than or equal to the speed of travel of the studded bands 12 so that the studs can remain in contact with the edge of the first sheet blank 2, and the speed of the component perpendicular to the direction of feed of the first sheet blank 2 is different from zero so that there is a definite contact of the edge to be welded of the first sheet blank 2 with the stop 4a.

The rollers 150 are covered with polyurethane.

In the embodiment shown in FIG. 1, the zone A further includes a lower chain 20 comprising articulated shoes which supports a part of the first sheet blank 2 located in proximity to the edge to be welded, while the ball rails 11 and the studded bands 12 support the other part of said first sheet blank.

The zone A also includes an initial part of an upper chain 30 having articulated shoes constituting a continuous contact surface with the upper face of the first sheet blank 2.

The upper articulated shoe chain 30 is placed in facing relation to the corresponding lower articulated shoe chain 20 and is adapted to cooperate with the latter for shifting or feeding the first sheet blank 2 by adherence and maintain said first sheet blank 2 in the correct longitudinal and lateral relative position.

The lower articulated shoe chain 20 and the upper articulated shoe chain 30 will be described in more detail hereinafter.

Depending on the contour of a series of sheet blanks 2, the position of the studs 13 of each band 12 is adjusted by means of the clutches 143 and the sheet blanks 2 are placed on the ball rails 11 by suitable means (not shown), such as a handling robot.

Then, the studs 13 of the bands 12 driven longitudinally come into contact with an edge of the first sheet blank 2 which is in this way fed longitudinally.

The first sheet blank 2 passes under the rollers 150 which impart to said sheet blank 2 a movement in translation which is substantially perpendicular to the direction of feed of this sheet blank 2 so that the edge to be welded of the sheet blank 2 comes into contact with the lateral face of the stop 4a and is in this way positioned on the axis of the laser beam 1.

The lower articulated shoe chain 20 is driven in synchronism with the studded bands 12 and supports a part of the first sheet blank 2.

The rollers 150 maintain the edges to be welded of the sheet blank 2 against the stop 4 a and, before this sheet blank 2 leaves the rollers 150, a part of said sheet blank 2 is gripped between the lower articulated shoe chain 20 and the upper articulated shoe chain 30 so that the sheet blank 2 is maintained in correct relative position by said articulated shoe chains 20 and 30 at the exit of the zone A.

The zone B of the installation shown in FIG. 1 comprises a horizontal conveyor belt 17 constituting a first continuous surface of contact with the lower face of the first sheet blank 2, the lower articulated shoe chain 20 constituting a second continuous surface of contact with the lower face of the first sheet blank 2 in proximity to the edge to be welded and, lastly, the upper articulated shoe chain 30 disposed in facing relation to the lower articulated shoe chain 20 is adapted to cooperate with the latter and thereby feed the first sheet blank 2 by adherence, as occurs at the end of the zone A.

The horizontal conveyor belt 17 is for example a belt having freely rotatable rollers or a belt having balls or it may be a rolling belt which travels longitudinally in synchronism with the lower articulated shoe chain 20.

The zone B further comprises a device for positioning the second sheet blank 3 comprising means 10 for supporting in a horizontal reference plane and for feeding the second sheet blank 3 in the direction toward the laser beam 1.

Said supporting and feeding means 10 for the second sheet blank 3 are identical to the supporting and feeding means 10 of the first sheet blank 2 and comprise, on one hand, a conveyor table formed by an alternating arrangement of rails 11 having balls and bands 12 provided with projecting studs 13 evenly spaced apart and, on the other hand, friction means 15 constituted by rollers 150 and adapted to be applied against the upper face of the second sheet blank 3 and impart to said second sheet blank 3 a movement in translation substantially perpendicular to the direction of feed of the sheet blanks 2 and 3.

The zone B also comprises a lower articulated shoe chain 40 supporting a part of the second sheet blank 3 located in proximity to the edge to be welded, while the ball rails 11 support the other part of said second sheet blank 3.

At the end of the zone B, an upper articulated shoe chain 50 constitutes a continuous surface of contact with the upper face of the second sheet blank 3.

The upper articulated shoe chain 50 is disposed in facing relation to the lower articulated shoe chain 40 and is adapted to cooperate with the latter and feed the second sheet blank 3 by adherence.

The lower articulated shoe chain 40 and the upper articulated shoe chain 50 constitute means for maintaining the second sheet blank 3 in the correct longitudinal and lateral relative position.

The sheet blanks 3 placed on the ball rails 11 by suitable means (not shown), such as a handling robot, are shifted or fed by the studs 13 of the bands 12 and, under the effect of the rollers 150, slide laterally on the ball rails 11 so that the edge to be welded of each second sheet blank 3 comes into contact with the edge to be welded of each first sheet blank 2 and is consequently positioned on the axis of the laser beam 1.

The rollers 150 maintain the edge to be welded of the second sheet blank 3 against the edge to be welded of the first sheet blank 2 and, before the second sheet blank 3 leaves the rollers 150, a part of the second sheet blank 3 is gripped between the lower articulated shoe chain 40 and the upper articulated shoe chain 50 and the edge to be welded of the second sheet blank 3 is thus maintained against the edge to be welded of the first sheet blank 2.

At the end of the zone B, the edges to be welded of the sheet blanks 2 and 3 are therefore positioned on the axis of the laser beam 1.

The zone C for guiding, conveying and welding the two sheet blanks 2 and 3 comprises means for longitudinally supporting the first sheet blank 2 in a horizontal reference plane which are constituted by the horizontal conveyor belt 17 and the lower articulated shoe chain 20 of the zone B which extends into the zone C.

The zone C further comprises horizontally movable means for maintaining the first sheet blank 2 in correct longitudinal and lateral relative position which comprise the upper articulated shoe chain 30 of the zone B which extends into the zone C and is cooperative with the lower articulated shoe chain 20 for feeding the first sheet blank 2 by adherence.

The zone C also comprises means for longitudinally supporting the second sheet blank 3 which comprise a horizontal conveyor belt 18 constituting a first surface of continuous contact with the lower face of the second sheet blank 3.

This horizontal conveyor belt 18 is in juxtaposed relation to the lower articulated shoe chain 40 of the zone B extending into the zone C and constituting a second surface of continuous contact with the lower face of the second sheet blank 3.

The horizontal conveyor belt 18 is for example a belt having freely rotatable rollers or a belt having balls, or it may be a rolling belt which moves longitudinally in synchronism with the lower articulated shoe chain 40.

The lower articulated shoe chain 40 supports a part of the second sheet blank 3 located in proximity to the edge to be welded, and the conveyor belt 18 supports the other part of the sheet blank 3.

The upper articulated shoe chain 50 also extends into the zone C and maintains the second sheet blank 3 in the correct longitudinal and lateral relative position.

The conveyor belts 17, 18 and the articulated shoe chains 20, 30, 40, 50 travel longitudinally in synchronism with one another and also with the studded bands 12.

The zone D for discharging the two welded sheet blanks comprises means 60 for supporting said welded sheet blanks and means (not shown) for removing the welded sheet blanks.

Said support means 60 may be constituted by a conveyor table, for example a table having rollers or balls, and the removing means may be constituted by a handling robot.

The means 60 for supporting the welded sheet blanks may also consist of the conveyor belts 17 and 18 and the lower chains 20 and 40 of the preceding zone C which extend into the zone D.

The zone D may also include means for inspecting, brushing and oiling the weld.

With reference now to FIGS. 6 to 8 the articulated shoe chains will now be described.

Each of the articulated shoe chains 20, 30, 40 and 50 forms a closed loop in a plane perpendicular to the sheet blanks 2 and 3.

Each articulated shoe chain 20, 30, 40 and 50 is carried by a pair of wheels (not shown) disposed at the respective ends of the loop.

Each articulated shoe chain 20, 30, 40 and 50 is driven for example by a motor-speed reducer system connected to one of the wheels.

The lower chain 20 comprises shoes 203 having a generally parallelepipedic shape and articulated together by pins 204 as shown in FIGS. 7 and 8.

The lower chain 20 further comprises bearing rollers 205 adapted to cooperate with the face of the shoes 203 remote from the face in contact with the second sheet blank 2.

These cylindrical rollers 205 having a rectilinear generatrix are placed relatively close to one another, the axis of rotation of the rollers being perpendicular to the direction of travel of the lower chain 20 and horizontal.

The rollers 205 support the lower chain 20 so that the surface of the chain in contact with the lower face of the first sheet blank 2 defines a horizontal reference plane for the positioning of this blank.

The upper chain 30 is constituted by shoes 303 having a generally parallelepipedic shape and articulated together by pins (not shown).

This upper chain 30 includes bearing rollers 305 which are freely rotatable and are adapted to cooperate with the face of the shoes 303 remote from the face in contact with the first sheet blank 2.

These cylindrical rollers 305 having a rectilinear generatrix are placed relatively close to one another, the axis of rotation of the rollers being perpendicular to the direction of travel of the upper chain 30 and horizontal.

The rollers 305 are so positioned that they exert a vertical pressure over the surface of the shoes 303 of the upper chain 30 so that the first sheet blank 2 is gripped between the shoes 203 and 303.

At least three rollers 305 are in contact with each shoe 303 in regions evenly spaced apart so that the compression force is distributed over the first sheet blank 2 so as to maintain the shoes 303 flat and permit a distribution of the force over a plurality of linear contacts.

The lower chain 40 comprises shoes 403 having a generally parallelepipedic shape and articulated together by pins (not shown).

This lower chain 40 includes freely rotatable bearing rollers 405 adapted to cooperate with the face of the shoes 403 remote from the face in contact with the second sheet blank 3.

The cylindrical rollers having a rectilinear generatrix 405 are placed relatively close to one another, the axis of rotation of these rollers being perpendicular to the direction of travel of the lower chain 40 and horizontal.

These rollers 405 support the lower chain 40 in such manner that the surface of the lower chain 40 in contact with the lower face of the second sheet blank 3 defines a horizontal reference plane for the positioning of the sheet blank.

At least three rollers 405 are in contact with each shoe 403.

The upper chain 50 comprises shoes 503 having a generally parallelepipedic shape and articulated together by pins 504 (not shown).

Each upper chain 50 comprises freely rotatable bearing rollers 505 adapted to cooperate with the face of the shoes 503 remote from the face in contact with the second sheet blank 3.

These rollers 505 having a rectilinear generatrix are placed relatively close to one another, the axis of rotation of these rollers being perpendicular to the direction of travel of the upper chain 50 and horizontal.

The bearing rollers 505 are so positioned that they exert a vertical pressure over the surface of the shoes 503 of the upper chain 50 so that the second sheet blank 3 is gripped between the shoes 403 and 503.

At least three rollers 505 are in contact with each shoe 503 in regions evenly spaced apart, distribute the compression force over the second sheet blank, maintain the shoes 503 flat and permit a distribution of the force over a plurality of linear contacts.

After having been progressively gripped between the shoes 203 and 303, 403 and 503 respectively in the zones A and B of the installation, each sheet blank 2 or 3 is guided and fed by adherence in the zone C between these shoes owing to the surface pressure exerted by the rollers 205 and 305, 405 and 505 respectively.

The articulated shoe chains 20, 30, 40 and 50 are driven in synchronism with one another so that it is possible to feed the sheet blanks 2 and 3 in the direction for welding with no possibility of slip between the sheet blanks and the shoes under pressure.

The end of the zone A and the zones B and C are provided with means 70 for maintaining the edge to be welded of the first sheet blank 2 on the axis of the laser beam 1.

As shown in FIG. 6, these means 70 for maintaining the edge to be welded of the first sheet blank 2 comprise two lateral and parallel guideways 71 and 72 disposed on each side of the horizontal plane in which the sheet blanks 2 and 3 travel.

The guideway 71 is formed by freely rotatable rollers 71a having vertical axes, said rollers 71a bearing against the lateral surface 203a of the shoes 203 of the lower chain 20 and being mounted on a support 73 fixed on a vertical reference surface 74.

The guideway 72 is also formed by freely rotatable rollers 72a having vertical axes, said rollers 72a bearing against the lateral surface 303a of the shoes 303 of the upper chain 30 and being mounted on a support 75 fixed on the vertical reference surface 74.

Owing to the guideways 71 and 72 and the reference surface 74, this arrangement permits maintaining the edge to be welded of the first sheet blank 2, which was previously positioned in the zone A of the installation, on the axis of the laser beam 1.

The end of the zone B and the zone C are provided with means 80 for exerting a lateral pressure on the edges to be welded of the two sheet blanks 2 and 3.

As shown in FIG. 6, these means 80 for exerting a lateral pressure on the edges to be welded of the two sheet blanks 2 and 3 comprise two lateral and parallel guideways 81 and 82 disposed on each side of the horizontal plane in which the sheet blanks travel.

The guideway 81 cooperates, on one hand, with the shoes 403 of the lower chain 40 and, on the other hand, with at
in a least one thrust element 84 which exerts a thrust direction perpendicular to the joint plane of the sheet blanks 2 and 3.

The guideway 82 cooperates, on one hand, with the shoes 503 of the upper chain 50 and, on the other hand, with at least one thrust element 85 exerting a thrust in a direction perpendicular to the joint plane of the sheet blanks 2 and 3.

The guideway 81 comprises freely rotatable rollers 81a having vertical axes, said rollers 81a bearing against the lateral surface 403a of the shoes 403 of the lower chain 40 and being mounted on a support 86 connected to the thrust element 84.

The guideway 82 comprises freely rotatable rollers 82a having vertical axes, said rollers 82a bearing against the lateral surface 503a of the shoes 503 of the upper chain 50 and being mounted on a support 87 connected to the thrust element 85.

What is claimed is:

1. A device for positioning sheet blanks in an installation for a continuous butt welding of at least two of said sheet blanks by means of a laser beam, said device comprising in combination: means for supporting in a horizontal reference plane and for feeding said sheet blanks in a direction toward said laser beam, means for laterally positioning edges to be welded of said sheet blanks on the axis of said laser beam, said supporting and feeding means for said sheet blanks comprising a conveyor table comprising an alternating arrangement of rails having balls and bands provided with projecting studs evenly spaced apart, and friction means combined with said conveyor table and adapted to be applied against an upper face of said sheet blanks and impart to said sheet blanks a movement in translation substantially perpendicular to the direction of feed of said sheet blanks, said ball rails and said bands extending in a direction parallel to the direction of feed of said sheet blanks and said bands being horizontally movable, and releasable driving means connected to said bands for adjusting the position of said studs of each band with respect to studs of the other bands as a function of the contour of said sheet blanks.

2. Device according to claim 1, wherein a guide plane provided by said ball rails is located above said studded bands and a part of said studs is located above said guide plane 3. Device according to claim 2, wherein said studs have a cylindrical shape and are each mounted on the respective band to be freely rotatable about a vertical axis.

4. Device according to claim 1, wherein said friction means comprise parallel rollers driven in rotation and having axes which make with the direction of feed of said sheet blanks an angle of between 75° and 85°.

5. Device according to claim 4, wherein the speed of rotation of said rollers is no higher than the speed of travel of said studded bands.

6. Device according to claim 5, wherein polyurethane covers said rollers.

7. Device according to claim 1, wherein said means for driving said studded bands comprise in combination a driving shaft, a drum engaged with each studded band, a clutch interposed between each drum and said shaft for connecting said drum to rotate with said shaft, and a jack associated with said clutch for controlling said clutch.

8. Device according to claim 7, wherein said jack is a hydraulic jack.

9. Device according to claim 7, wherein each drum defines a biconical central bore having tapers converging inwardly of said drum toward the axis of said drum.

10. Device according to claim 9, wherein each clutch comprises a hub having two independent rings which have a conical outer shape and are connected to rotate with said driving shaft, each ring being movable in translation toward each other in a direction parallel to the respective driving shaft under the action of the respective jack so as to connect the respective drum to rotate with said driving shaft.

11. Device according to claim 10, comprising a spring interposed between each of said two rings of the respective clutch.

* * * * *

UNITED STATES PATENT AND TRADEMARK OFFICE
CERTIFICATE OF CORRECTION

PATENT NO. : 5,364,006
DATED : November 15, 1994
INVENTOR(S) : Gilles PERU, et al.

It is certified that error appears in the above-indentified patent and that said Letters Patent is hereby corrected as shown below:

On the title page, Items [19] and [75], the first inventor's name is listed incorrectly. It should read:

Item [19], "Gilles et al" should be --Peru et al.--

Item [75], the first inventor's name should read:

--Gilles Peru;--

Signed and Sealed this

Twenty-first Day of February, 1995

Attest:

BRUCE LEHMAN

*Attesting Officer*     *Commissioner of Patents and Trademarks*